United States Patent [19]

Sharnoff et al.

[11] Patent Number: 5,216,527
[45] Date of Patent: Jun. 1, 1993

[54] HOLOGRAPHIC COLLATION

[76] Inventors: Mark Sharnoff, 278 Orchard Rd., Newark, Del. 19711; Hungyi Lin, 202 Cheyney Ct., Hockessin, Del. 19707

[21] Appl. No.: 785,301

[22] Filed: Oct. 30, 1991

[51] Int. Cl.$^5$ .................. G01B 9/025; G03H 1/10; G03H 1/28
[52] U.S. Cl. .................. 359/10; 356/347; 359/24; 359/30
[58] Field of Search .................. 359/10, 11, 24, 28, 359/30; 356/347, 348

[56] References Cited

U.S. PATENT DOCUMENTS

| 3,572,882 | 3/1971 | Neumann | 356/347 |
|---|---|---|---|
| 3,627,426 | 12/1971 | Tsuruta et al. | 356/347 |
| 3,715,164 | 2/1973 | Heflinger | 356/347 |
| 3,837,726 | 9/1974 | Suzuki et al. | 356/347 |
| 4,464,052 | 8/1984 | Neumann | 356/347 |
| 4,627,729 | 12/1986 | Breuckmann et al. | 356/347 |
| 4,707,135 | 11/1987 | Swain et al. | 356/347 |
| 4,725,142 | 2/1988 | Sharnoff | 356/347 |
| 4,999,681 | 3/1991 | Mader | 356/347 |

OTHER PUBLICATIONS

Brown et al, "The Computer-Aided Holophoto-Elastic Method," *Experimental Mechanics*, vol. 20, Jun. 1990, pp. 135 to 144.

Collins, "Difference Holography," *Applied Optics*, vol. 7, No. 1, Jan. 1968, pp. 203 to 205.

Fourney et al, "Recording Polarization Effects via Holography," *J. Opt. Soc. Am.*, vol. 58, 1968, pp. 701 to 702.

Lai et al, "Dual-Reference Holographic Interferometry With a Double Pulsed Laser," *Applied Optics*, vol. 27, No. 18, Sep. 15, 1988, pp. 3855 to 3858.

Nishida et al, "A New Interferometric Method of Two-Dimensional Stress Analysis," *Experimental Mechanics*, vol. 4, Dec. 1964, pp. 366 to 376.

Tsuruta et al, "Hologram Interferometry Using Two Reference Beams," *Japanese Journal of Applied Physics*, vol. 7, No. 9, Sep. 1968, pp. 1092 to 1100.

Biedermann et al, "Combining Hypersensitization and Rapid in Situ Processing For Time-Average Observation in Real-Time Holograph Interferometry," *Journal of Physics E*, vol. 3, 1970, pp. 669 to 680.

Lin et al, "Microscopic Mapping of Subnanometric Motion in Semitransparent Systems," *Experimental Mechanics*, Sep. 1991, pp. 257 to 263.

Assa et al, "The Application of Holographic Multiplexing To Record Separate Isopachic-and Isochromatic--Fringe Patterns," *Experimental Mechanics*, Dec. 1974, vol. 14, No. 12, pp. 502-504.

*Primary Examiner*—Martin Lerner

[57] ABSTRACT

A method and apparatus for the collation or fine comparison of closely related images made with coherent light, such as those that may arise in holographic interferometry, in holo-photoelasticity, or in speckle interferometry.

7 Claims, 7 Drawing Sheets

HOLOGRAPHIC COLLATION

REFERENCES

G. M. Brown and J. L. Sullivan, "The Computer-aided Holophotoelastic Method". Exp. Mech. 20, 135–144 (1990) L. F. Collins, "Difference Holography", Applied Optics 8, 203–205 (1968)

J. C. Dainty, ed., *Laser Speckle and Related Phenomena*, Berlin, Springer-Verlag, 1984

D. Gabor, "Holography, 1948–1971", Science 177, 299–313 (1972)

M. E. Fourney, A. P. Waggoner, and K. V. Mate, "Recording Polarization Effects via Holography", J. Opt. Soc. Am. 58, 701–702 (1968)

G. Lai and T. Yatagai, "Dual-reference holographic interferometry with a double pulsed laser", Applied Optics Vol. 27, No. 18, pp 3855–3858, Sep. 15, 1988

D. B. Neumann, "Differential Holographic Interferometry", U.S. Pat. No. 4,464,052, Aug. 7, 1984

M. Nisida and H. Saito, "A New Interferometric Method of Two-dimensional Stress Analysis". Exp. Mech. 4, 366–376 (1964)

M. Sharnoff, "Microdifferential Holography", J. Optical Soc. Amer. A 2, 1619–1628 (1985)

M. Sharnoff, "Differential Holography", U.S. Pat. No. 4,725,142, Feb. 16, 1988

T. Tsurata, N. Shiotake, and Y. Itoh, "Holographic Interferometry Using Two Reference Beams", Japanese Journal of Applied Physics 7, No. 9, September 1968, pp. 1092–1100

OBJECT AND SUMMARY OF THE INVENTION

It is the principal object of this invention to produce accurate collation of images that differ principally in fine detail, particularly where the images or their differences are eventually to be scanned, determined, processed, compared, or interpreted by digital techniques. The images are encoded in pairs by means of a double reference wave holographic process, one reference wave being used to encode one image of a pair, and the other reference wave being used to encode the other image. The two holograms are incoherently recorded on a single holographic plate or other unitary holographic recording medium. Because the reference waves can be made coherent with eachother, the images reconstructed when the two reference waves simultaneously illuminate the developed holograms can be manipulated coherently. Once the developed holographic plate, or other recording medium, is returned to the position and orientation it occupied during its exposure, the relative intensities and phases of the two reference waves can be adjusted to produce nearly complete destructive interference between the two reconstructed images. The small difference between the original images is conveyed by the residual intensity in the interference pattern of the two reconstructed images. This difference can then be directly recorded by a digital scanner, such as a CCD based video camera coupled to a memory bank and computer, with an accuracy and signal-to-noise ratio very much higher than obtainable by direct digital subtraction of the original images. Furthermore, the highly precise registration of the reconstructed images and balance of their intensities will be unaffected by further manipulation of the phases of the two reference waves or by their alternate obstruction. Deliberately rephased superpositions of the reconstructed images can also be scanned; or, if the reference waves are made to impinge only one at a time upon the developed holographic recording medium, the reconstructed images can be digitized individually and processed by the computer in any way that it permits, including any that requires or relies upon balance between the image intensities.

When the images to be compared are more than two, a sequence of hologram pairs is recorded in such fashion that the image encoded in one hologram of any pair is encoded also in one hologram of at least one other pair, there being, in all, sufficiently many holograms so that each of the images is encoded in at least one of them.

While the invention is primarily optical in conception, the principles upon which it depends are valid for any electromagnetic radiation and can be put to practical use in any region of the spectrum for which a source of coherent radiation is available and for which compactly arrayed sensors appropriate for recording holograms can be constructed. In the soft Xray portion of the spectrum, for instance, high-resolution photoresists are the analogues of photographic film and are in current use both in Xray holography and in lithography. Beamsplitters and focussing devices for soft Xrays are likewise available, as are mirrors, collimating devices, filters and attenuators, and polarizers; and a synchrotron source of Xrays, equipped with monochromator and collimator, can generate a spatially and temporally coherent beam of Xrays analogous to the beam of visible light that emerges from a laser during operation.

BACKGROUND OF THE INVENTION

Figure 1:
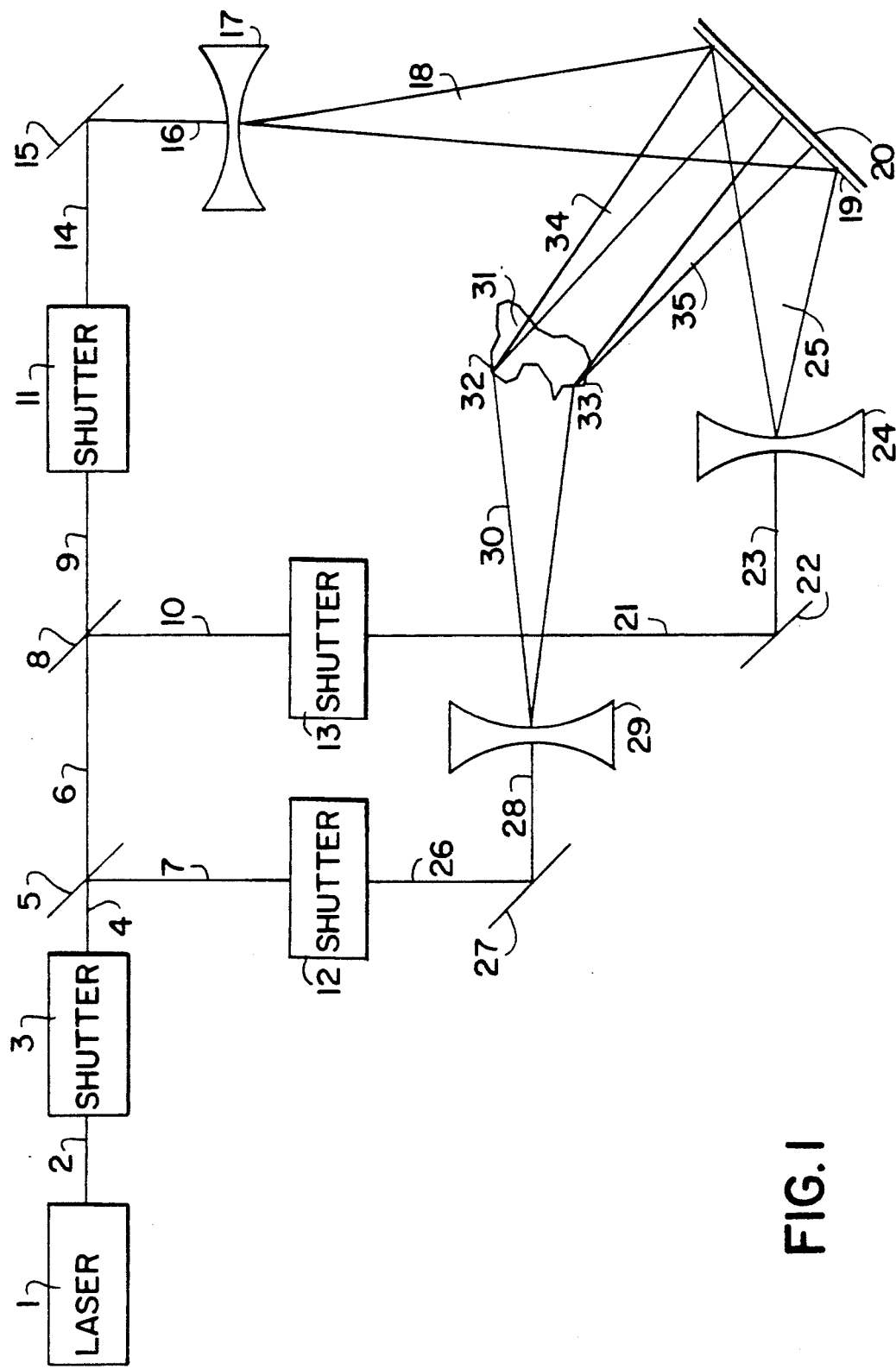
FIG. 1 is a plan schematic view of an arrangement of apparatus that permits a pair of holograms to be recorded sequentially in superposition.

The present invention concerns the comparison of images which differ slightly from one another. The images may be part of a sequence of successive scenes, as of a vibrating object seen in various phases of its motion; or they may part of a group of images formed simultaneously, as in stereomicroscopy. Holographic interferometry poses an acute requirement for accurate comparison of images, and it was in the course of their activity in this area that the authors were led to the invention disclosed herein. The invention is closely related to the art taught by Sharnoff in U.S. Pat. No.4,725,142.

Central to that art is the principle that in holographic study of the fine deformations or dynamics of a subject under test the holograms should be recorded differentially in conjugate pairs. The conjugate images reconstructed when the differential holograms of a pair are illuminated one at a time can be scanned electronically and stored in a memory bank; dynamic shifts in the amplitude or the phase of light coming from the subject under test can then be determined from digital addition or subtraction of the scanned images.

In the practical elaboration of this method to subjects of any complexity, image collation presents a major difficulty. If the images to be scanned are not put into registration to within a very small fraction of the diameter of one pixel of the scanning device, errors of sampling make any digital comparison intolerably noisy. The best signal-to-noise ratios that the authors could obtain by digital subtraction of two identical holographic scenes placed into registration by purely mechanical means were a factor of 100 to 1000 lower than could be obtained, following the art of Sharnoff, by direct holographic subtraction of the scene from itself. The practice we teach below permits images to be digitally subtracted without deficiency of registration, however complex and finely detailed the images might be.

An important precursor to this practice was taught by Sharnoff in columns 15-17 and FIG. 9 of the disclosure of U.S. Pat. No. 4,725,142. Work related to our practice appears to have been done by G. Lai and T. Yatagai in "Dual-reference holographic interferometry with a double pulsed laser", Applied Optics Vol. 27, No. 18, Sep. 15, 1988, pp 3855-3858.

DETAILED DESCRIPTION OF THE INVENTION

In the electronic comparison of images differing in final detail it is important to position them so that they have exactly the same dimensions and occupy, successively, exactly the same positions and orientations with respect to the electronic imaging or sensing device. However the images are projected onto said electronic imaging or sensing device, hereinafter called simply a scanner, the positions of those features that the images possess in common must appear to coincide to within a small fraction of the diameter of the scanner's detection unit, or pixel. When the coincidence between corresponding features that the images possess in common has been satisfactorily effected, the images will be said to have been collated. The process of securing satisfactory coincidence between corresponding features that the images possess in common will be called collation. The action that produces collation will be called collating, and any material device, machine, or apparatus that makes collation possible will be called a collator.

In the practice of the invention any two images whose comparison is desired are collated interferometrically, the collation being judged by the degree to which the two images are brought into destructive interference. Destructive interference between corresponding details present in both images will not take place unless they coincide to within one half wavelength or less. Because the wavelength of light, typically 0.5 $\mu$m is so much smaller than the diameter of a typical pixel, typically 7.5 to 20 $\mu$m in modern scanners like CCD TV cameras, collation by destructive interference between two images is likely to be more accurate than any purely mechanical method of collation. Like mechanical collation, interferometric collation is facilitated by prior knowledge of the images, or by the presence of bright, readily recognizable features or fiducial marks common to both images. The collation may then be quickly judged by the degree to which the bright, recognizable features or fiducial marks have been brought into coincidence. In collation by destructive interference, the proper superposition of the bright recognizable features or fiducial marks would make them appear maximally black.

In the following description the word coherent will refer to waves, holograms, beams of light or other radiation, or images that exhibit interference, or to processes that depend upon interference. Thus, when two coherent waves travel simultaneously through a common region of space, a pattern of interference fringes is observable therein. The pattern will be determined by the geometrical form of the wavefronts—equiphase surfaces of the waves—and by the relative phases of the two waves at any fixed reference point in space. The locations of the fringes, and oft-times even the pattern itself, will be found to be affected by any action that alters the relative phases of the waves at the fixed point in question. If the waves are light waves, their interference patterns can be photographed, and it can be confirmed that the locations of fringes are affected by changes in the relative phases of the waves, for the distribution of blackening on any of the photographic negatives would represent the spatial distribution of the square of the coherent sum of wave amplitudes. A photograph could also be made by exposing a negative successively to the two coherent light waves one at a time, rather than simultaneously. Negatives made in this way would be insensitive to change in the relative phases of the waves at the reference point. Blackening in such negatives would represent not a coherent sum of the waves, but only the spatial distribution of the sum of their intensities.

The word incoherent will in the following description refer to waves, holograms, beams of light or other radiation, or images that do not exhibit interference, or to processes that do not depend upon coherence. Thus, two light waves that are coherent can be made incoherent by polarizing them orthogonally. For instance, if the waves travel horizontally, this could be done by passing one through a Polaroid whose axis is vertical and the other through a Polaroid whose axis lies horizontally at right angles to the direction of its propagation. No interference pattern is observable between light waves whose directions of polarization are mutually perpendicular, and a photographic negative exposed simultaneously to two such waves will exhibit no fringes of interference between them even if the waves are derived from the same laser. Digital addition or subtraction of two images successively exposed to a TV camera or other scanner is incoherent even in cases in which the images, were they present simultaneously, would be found coherent. In particular, the result of the aforesaid addition or subtraction of successively exposed images would not depend upon the relative phases between the images when simultaneously present.

A hologram is a record of the pattern of interference between two waves that are coherent. One of the two waves whose pattern of interference has been recorded or is to be recorded in a hologram will be called the object wave, whether or not it carries information directly from a real object such as a subject under test. The other of the two waves whose pattern of interference has been recorded or is to be recorded in a hologram will be called the reference wave. Any wavefront of the reference wave will normally be a geometrically simple surface such as a portion of a plane or sphere. The geometrical simplicity of these wavefronts enables the reference wave easily to be produced, controlled, and reproduced. If the object wave and the reference wave are both light waves, and if photographic emulsion on a holographic plate be exposed so as to record the pattern of interference between the object wave and reference wave, the developed photographic emulsion on the holographic plate is a hologram. If the hologram be returned to the position and orientation occupied by the photographic emulsion on the holographic plate during its exposure to record the pattern of interference between the object wave and the reference wave, and if it be thereupon illuminated by a wave having the same wavelength as the reference wave, and having also wavefronts of the same curvature and orientation as the wavefronts of the reference wave, a remarkable phenomenon takes place: that portion of the object wave that was incident upon and would have continued through and into the space beyond the surface occupied by the photographic emulsion on the holographic plate, had the photographic emulsion not been actually present, is now produced through the hologram and into the space beyond it, just as though the object wave continued to be incident upon the surface occupied by the hologram, the hologram not being itself actually present. The remarkable phenomenon will be called reconstruction of the object wave, or simply reconstruction; and said portion of the object wave will be called the reconstructed object wave, or, simply, the reconstructed wave. An image can be formed from the reconstructed object wave by means of a suitable optical system. The image is indistinguishable from the image that said optical system would form from the object wave when the object wave is present. The hologram will therefore be said to encode the object wave. The hologram will be said also to encode any image that can be formed from the reconstructed object wave. Any image formed from the reconstructed object wave will be called a reconstructed image and be said to have been formed or obtained by reconstruction from the hologram in which the object wave had been encoded. It is well known in the holographic art that when the object wave and the reference wave are incident from different directions upon the photographic emulsion used to record the pattern of their interference, images reconstructed from the resulting hologram are or can be made disjoint from the reference wave.

A simple hologram is the record of the pattern of interference between an object wave and a reference wave at a single instant of time or during an interval within which there are no changes either in the object wave or in the reference wave. If the object wave is obtained by reflection, scattering, transmission, or diffraction of light used to illuminate a subject under test, an image reconstructed from a simple hologram will be an optical counterpart of the subject under test that depicts the subject well. A composite hologram is a record of the pattern of interference between an object wave and a reference wave sampled at two or more instants of time, between which there may be changes in either or both of the object wave and the relative phase of the reference wave. If the said instants of time are discrete, it may be convenient to call form in which the object wave exists at the first instant of time the first object wave and to call the form in which the object wave exists at the second instant of time the second object wave, and so forth, and to think of the first object wave and second object wave as members of a group of object waves. If the object wave is obtained by reflection, scattering, transmission, or diffraction of light used to illuminate a subject under test, an image reconstructed from a composite hologram may not be a perfectly recognizable optical counterpart of the subject under test. If, for instance, the subject under test undergoes a small deformation during the sampling process, an image reconstructed from the composite hologram may depict the subject under test superposed on a pattern of dark and bright bands or fringes. The image is interpreted not as that of an object made up of rigid disjoint segments of the subject under test, but as an interferogram of the entire subject in various states of deformation. The locations and intensities of the fringes of such an interferogram may be affected by shifts in the relative phase of the reference wave during the sampling process. Thus an image reconstructed from a composite hologram need bear no simple or unique relation to the appearance of the subject when undisturbed, or even to the deformations of the subject when undergoing stress. There may indeed be no subject that when illuminated at rest would resemble a reconstructed image that is an interferogram. Nonetheless it will often be convenient in the following description to call the group of object waves reconstructed from a composite hologram the reconstructed wave, and to call an interferogram formed from the group of waves reconstructed from a composite hologram a reconstructed image, just as though the reconstructed wave or group of waves had been produced by reconstruction from a simple hologram in which an image identical to said interferogram had been encoded. When clarity is desired, such an image will be called a composite image.

In our invention the images to be collated are obtained by reconstruction from holograms in which they are originally or have been encoded. It will be shown hereinbelow that if the images are to be accurately compared and distinguished it is essential that a hologram in which any one image is encoded be recorded incoherently from the hologram in which any other image is encoded. When two holograms have no point in common in the recording medium they are by nature incoherent. It will often be convenient, however, to record two holograms as a pair superposed on a common region of the recording medium, as was taught by Sharnoff in the patent cited hereinabove.

There are two fundamental ways of superposing two holograms incoherently in the same region of a holographic plate or other recording device. One way is to record the two holograms successively. The other is to record them simultaneously in an arrangement which causes the object wave and reference wave whose pattern of interference is recorded in one of the two holograms to be polarized perpendicularly to the object wave and reference wave whose pattern of interference is recorded in the other of the two holograms. Among several ways of ensuring this is, for instance, the use of Polaroids or other polarizing devices in the fashion described hereinabove. In order to permit the object wave encoded in the second or two superposed holograms to be reconstructed independently of the object wave encoded in the first of the two superposed holograms, the wavefronts of the reference wave used to record the second hologram must differ in curvature or in orientation from the wavefronts used to record the first hologram. The two reference waves should have precisely equal wavelengths; and so they should be derived from one and the same laser beam, or other source of coherent radiation, in such fashion that the largest difference of optical path-lengths between the primary beamsplitter and the holographic plate not exceed the coherence length of the radiation. When the two holograms to be superposed are to be recorded in sequence, rather than simultaneously, no restriction need be imposed on the polarization of either object wave or on the polarization of either reference wave.

Referring to FIG. 1, a sketch is shown of an arrangement of apparatus that permits an object wave and two reference waves to be generated from a single laser beam, the wavefronts of one of the two reference waves differing in orientation from those of the other reference beam. The external beam 2 of laser 1 is passed through shutter 3, forming shuttered beam 4. This is directed at beamsplitter 5 where it is divided into two sub-beams 6 and 7. Sub-beam 6 is directed upon beamsplitter 8, which divides it further into sub-beam 9 and sub-beam 10. Sub-beam 9 is passed through shutter 11, and the emerging portion 14 undergoes reflection at mirror 15, forming the sub-beam 16. Sub-beam 16 is passed through diverging lens 17, becoming the diverging beam 18 directed at 20, upon which is mounted a holographic recording medium such as a holographic plate coated with a photographic emulsion 19. Sub-beam 10 is passed through shutter 13, and the emerging portion 21 is reflected at mirror 22, forming sub-beam 23. Sub-beam 23 is passed through diverging lens 24, becoming the diverging beam 25 directed at 20. Each of the diverging beams indicated as 18 and 25 serves as a reference wave. Sub-beam 7 is passed through shutter 12, and the emerging portion 26 is reflected at mirror 27, forming sub-beam 28. Sub-beam 28 is diverged by passage through lens 29, and directed as diverging beam 30 against the subject 31. Diffraction and scattering of 30 by the subject is indicated by pencils 34 and 35 radiating outward from two representative points 32 and 33 of 31. Pencils 34 and 35 are representative and do not encompass all possible paths by which the light of 30 might reach 19 after having been affected by subject 31; nonetheless, in combination they will be considered to represent the object wave. The sum of the distances along 6, 9, 11, 14, 16, 17, and 18 must differ from the sum of distances along 7, 12, 26, 28, 29, 30, and 34 or 35 by less than the coherence length of the laser beam 2. Similarly, the sum of distances along 6, 10, 13, 21, 23, 24, and 25 must differ from the sum of distances along 7, 12, 26, 28, 29, 30, and 34 or 35 by less than the coherence length of the laser beam 2. The timing of the exposure or exposures of the photographic emulsion at 19 to 34–35, 18, and 25 is controlled by shutter 3. The object wave 34–35 can be extinguished by means of shutter 12. Reference wave 18 can be extinguished independently of reference wave 25 by means of shutter 11, and reference wave 25 can be extinguished independently of reference wave 18 by means of shutter 13. Shutters 3 and 12 are both open, and at least one of shutters 11 and 13 are also open, during the exposure of the photographic emulsion at 19 to record the pattern of interference between the object wave 34–35 and reference wave 18. Shutters 3 and 12 are both open, and at least one of shutters 11 and 13 are also open, during the exposure of the photographic emulsion 20 to record the pattern of interference between 34–35 and 25. It is to be understood that FIG. 1 is a plan view, and it is not necessary that the plane in which sub-beams 6 and 7 travel coincide with the plane in which sub-beams 9 and 10 travel or the plane in which sub-beams 9 and 16 travel. Nor is it necessary that the plane in which sub-beams 9 and 16 travel coincide with or be parallel with the plane in which sub-beams 10 and 23 travel. Whatever the actual paths and directions of the beams indicated in FIG. 1, it is important only that reference waves 18 and 25 are projected towards a common region of 20 and that said common region is accessible also to object wave 34–35.

The arrangement of apparatus shown in FIG. 1 is suitable for recording a composite hologram, as follows: With the unexposed photographic emulsion 19 on the holographic plate held in place at 20, and with the subject in place at 31, shutter 13 is held closed, and shutters 11 and 12 are kept open. Shutter 3 is briefly opened, then closed; and at a later time it is opened briefly again, and finally closed. If, during the interval between the brief openings of the shutter 3 there is no change in the subject at 31 and no change in the disposition of apparatus, apart from shutter 3, then the doubly exposed photographic emulsion of 20 becomes, upon development, a simple hologram. If the subject at 31 undergoes motion or deformation during the interval between the brief openings of the shutter 3, the doubly exposed photographic emulsion of 19 becomes, upon development, a composite hologram. It is not necessary that all the apparatus shown in FIG. 1 remain stationary during the recording of a composite hologram. For instance, as taught by Sharnoff in the patent cited hereinabove, during recording the mirror 15 could be given a displacement in the direction perpendicular to its reflecting surface, it being understood that the displacement itself be no larger than one wavelength of the laser light. Owing to the exceeding smallness of this displacement in comparison to the diameter of the laser beam 2 and attendant sub-beams 14 and 16, the lateral displacement of reflected sub-beam 16 will be imperceptible. Nonetheless, the sum of the optical path lengths along 6, 9, 11, 14, 16, 17 of FIG. 1 will have been increased by the amount 2h cos$\theta$, where h is the displacement of mirror 15 and $\theta$ is the angle of incidence of sub-beam 14 upon it. The phase with which the reference wave 18 impinges upon 20 will have been thereby shifted by an amount ($4\pi h \cos\theta$)/$\lambda$ radians, where $\lambda$ is the wavelength of the light comprising sub-beam 14. One means of securing the motion of mirror 15 is that of attaching it to a piezoelectric transducer supplied with an appropriate voltage waveform, as described by Sharnoff in the patent cited hereinabove.

Figure 2:
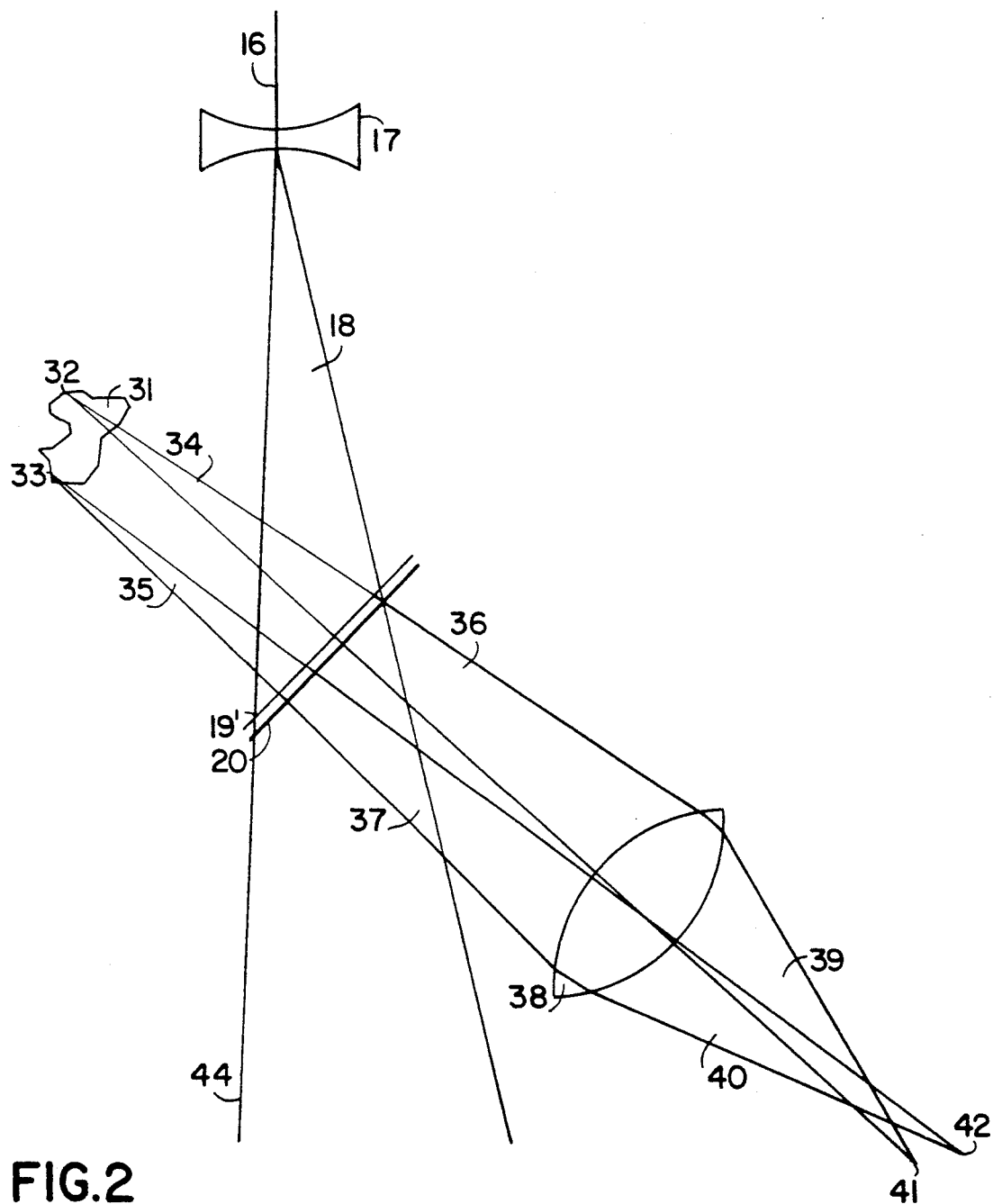
FIG. 2 is a schematic drawing showing the relation between the position and orientation of the holographic recording medium to one of the reference waves, to the object wave, and to the reconstructed wave pertinent to the apparatus of FIG. 1. The Figure shows also a method of forming an image from the reconstructed wave.

In the reconstruction of a wave or an image encoded in the composite hologram constituted, after its development, by the photographic emulsion exposed to form a composite hologram as explained hereinabove, the developed photographic emulsion 19' is placed at 20, in the same orientation as during in its exposure. Shutters 3 and 11 are held open, and shutters 12 and 13 are closed. The diverging beam 18 will impinge upon 20 as before, and its passage through the composite hologram 19' will reconstruct the wave encoded therein. The diverging beam 18 will also pass through the composite hologram into the space beyond it, but will travel in a direction different from the direction followed by the reconstructed wave. A converging lens of appropriate power can be placed in the space beyond the composite hologram at such position as to intercept the reconstructed wave but not transmitted reference wave. The power of the converging lens can be preselected to ensure that the reconstructed wave that the converging lens intercepts is focussed by its passage therethrough as an image in any desired plane beyond said converging lens. Referring to FIG. 2, the hologram 19' at 20 is illuminated by the diverging beam 18, which serves as a reference wave which passes therethrough as wave 44, creating by its passage through 19' the reconstructed wave 36, 37. The converging lens 38 converts the reconstructed wave 36, 37 into pencils 39 and 40 of light that are brought to focus in points 41 and 42. The subject 30 and the pencils 34 and 35 are not normally present during the reconstruction process but are included as dotted lines in FIG. 3 in order to emphasize the relation of 36 and 37 to the geometry FIG. 1. In particular, the points 41 and 42 are images of the points labeled 32 and 33 in FIG. 1.

The arrangement of apparatus shown in FIG. 1 is suitable for recording a superposed pair of simple holograms, as follows: With the unexposed photographic emulsion 19 on the holographic plate in place at 20, and with the subject in place at 31. shutter 13 is held closed, and shutters 11 and 12 are kept open. Shutter 3 is briefly opened, then closed. Shutter 11 is then closed, and shutter 13 opened and held open while shutter 3 is briefly opened a second time.

In the reconstruction of the object waves or images encoded in the superposed pair of simple holograms constituted, after its development, by the photographic emulsion exposed to form a superposed pair of simple holograms as explained hereinabove, the developed photographic emulsion 19" is placed at 20, in the same orientation as during its exposure. Shutters 3 and 11 are held open, and shutters 12 and 13 are closed. The diverging beam 18 will impinge upon 20 as before, and its passage through the superposed pair 19" of simple holograms will reconstruct that object wave encoded in the simple hologram recorded when the diverging beam 18 incident upon 20 served as the reference wave. The arrangement of this portion of the reconstruction process is as shown in FIG. 2, save that the composite hologram 19' therein is to be replaced by a superposed pair of simple holograms.

Figure 3:
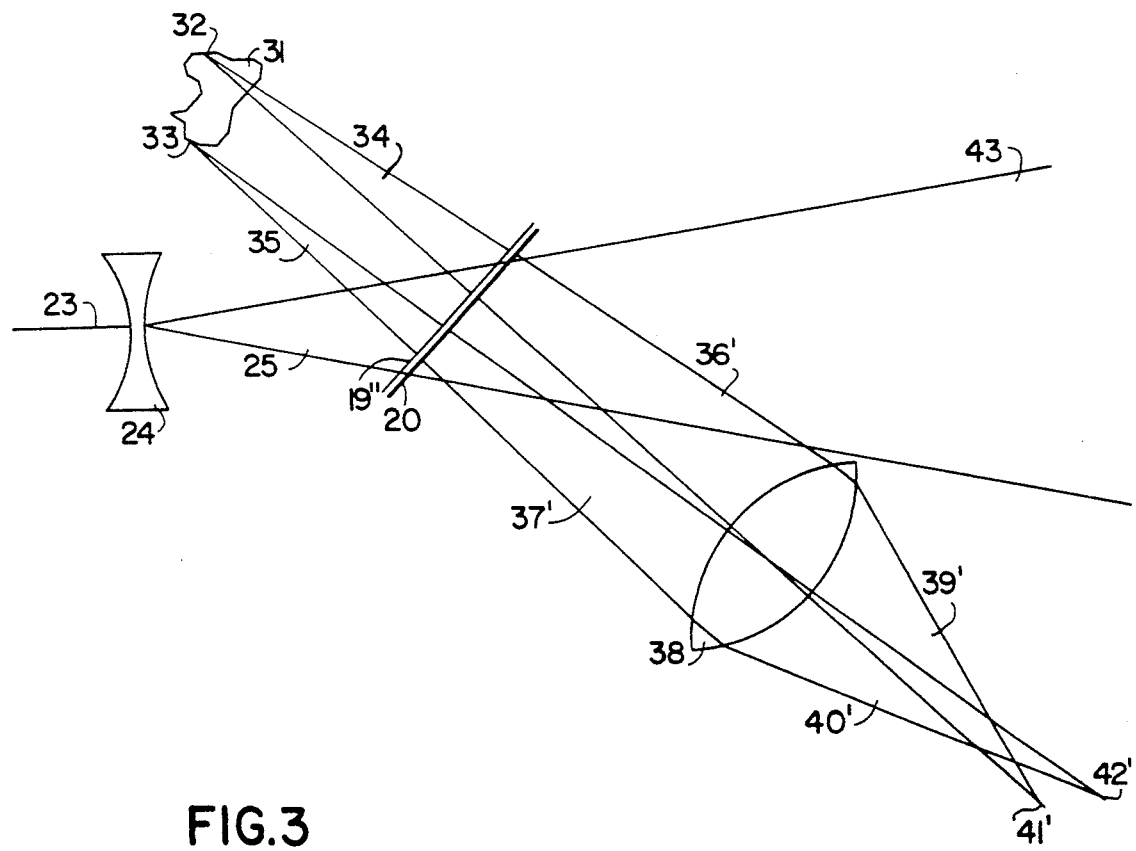
FIG. 3 is a schematic drawing showing the relation between the position and orientation of the holographic recording medium to the other of the reference waves, to the object wave, and to the reconstructed wave pertinent to the apparatus of FIG. 1.

The second portion of the reconstruction proceeds with shutter 11 now closed and shutter 13 now held open. The diverging beam 25 will impinge upon 20 as during recording, and its passage through the superposed pair 19" of simple holograms will reconstruct that object wave encoded in the simple hologram recorded when the diverging beam 25 incident upon 20 served as the reference wave. Diverging beam 25 will also pass through the superposed pair 19" of simple holograms into the space beyond it, but will travel in a direction different from the direction followed by the reconstructed wave. Referring to FIG. 3, the hologram 19" is illuminated by diverging beam 25, which serves as a reference wave which passes therethrough as wave 43, creating by its passage through 19" the reconstructed wave 36', 37'. The converging lens 38 converts the reconstructed wave 36',37' into pencils 39' and 40' of light that are brought to focus in points 41' and 42'. The subject 30 and the pencils 34 and 35 are not normally present during the reconstruction process but are included as dotted lines in FIG. 3 in order to emphasize the relation of 36' and 37' to the geometry FIG. 1. In particular, the points 41' and 42' are images of the points labeled 32 and 33 in FIG. 1.

If desired, reconstructed waves 36,37 and 36',37' can be simultaneously projected into converging lens 38. This can be effected by reopening shutter 11 while shutter 13 is held open.

Figure 4:
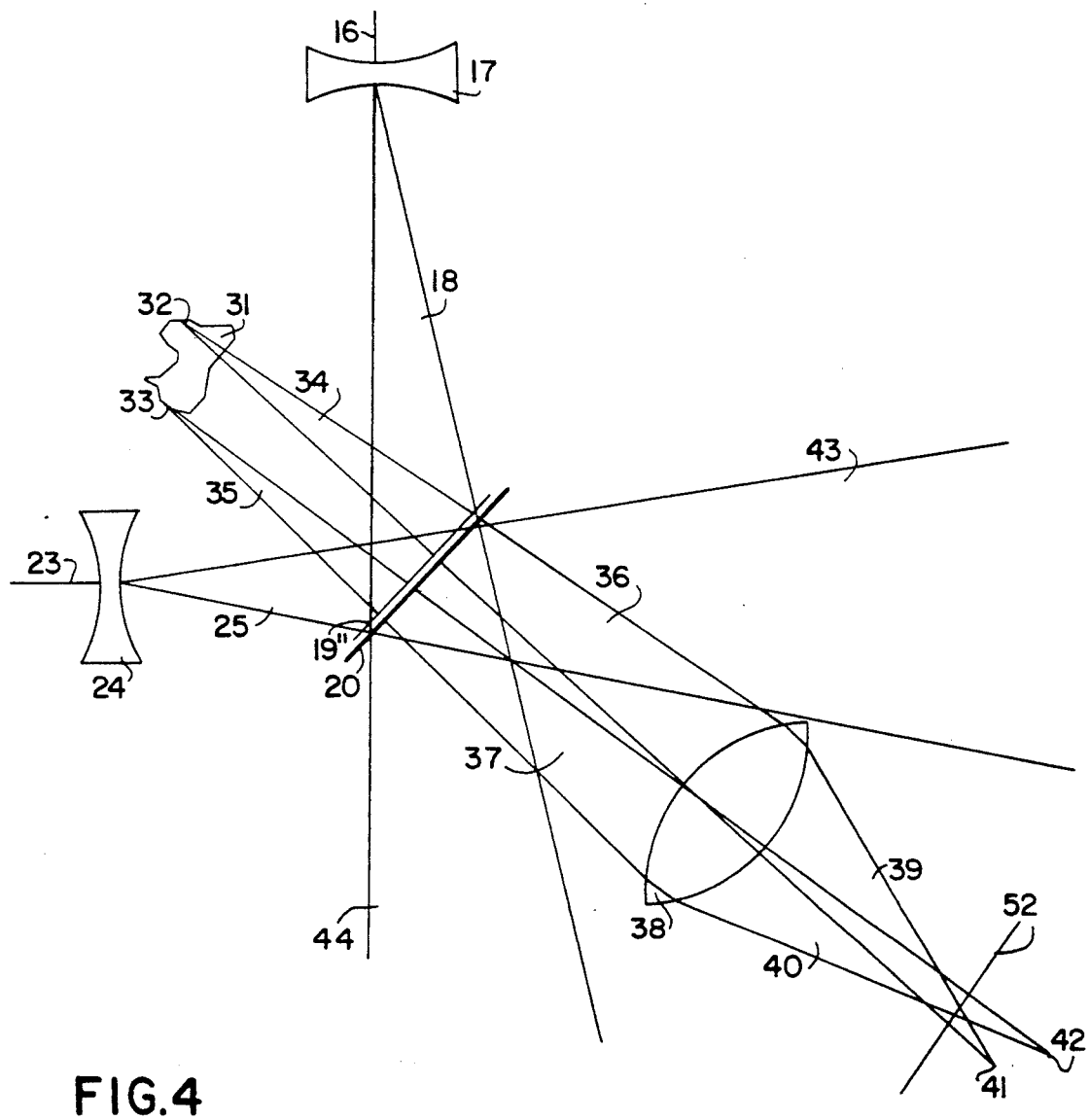
FIG. 4 is a schematic drawing showing the relation between the two reference waves, the object wave, and the reconstructed waves pertinent to the apparatus of FIG. 1, and showing also their relation to the position of a lens or other device intended to form images from the reconstructed waves.

It is important to note that if the subject 31 does not change during the process of recording the superposed pair of simple holograms, the reconstructed object wave 36,37 has wavefronts that are, part from holographic reconstruction noise and other small irregularities that attend holographic reconstruction, of the same form and orientation as the wavefronts of the reconstructed object wave 36',37'. Consequently the wavefronts within pencils 39 and 40 have nearly the same form and orientation as the wavefronts within pencils 39' and 40', and the points 41 and 42 at which pencils 39 and 40 are brought to focus by converging lens 38 coincide nearly with the points 41' and 42' at which pencils 39' and 40' are brought to focus. Thus if, when shutter 11 is open and shutter 13 is closed, a scanner be placed in a plane containing points 41 and 42, the image that it acquires will be found to be in fair registration with the image acquired with the scanner in the same position, but with shutter 11 closed and shutter 13 open. Correspondingly, if all but a single element of the subject at 31 remain unchanged during the process of recording the superposed pair of simple holograms, the image formed by converging lens 38 when illuminated by reconstructed object wave 36,37 will be found in fairly good registration, apart from the image of the aforesaid single element of the subject 31, with the image formed by converging lens 38 when illuminated by reconstructed object wave 36', 37'. Consequently if, when shutter 11 is open and shutter 13 is closed, a scanner be placed where converging lens 38 brings to focus reconstructed wave 36, 37, the image that the scanner acquires will be found to be in fair but not necessarily perfect registration with the image acquired with the scanner in the same position, but with shutter 11 closed and shutter 13 open. Referring to FIG. 4, the fairly good registration of images is suggested by the formation of single image points 41 of 32 and 42 of 33 even when both reference waves 18 and 25 simultaneously illuminate the superposed pair 19" of simple holograms.

A superposed pair of simple holograms recorded as described hereinabove differs from a composite hologram recorded as described hereinabove only in that two reference waves, one reference wave having wavefronts different in orientation than the other reference wave, are sequentially used to record the superposed pair of simple holograms. The properties exhibited by said superposed pair of simple holograms when waves are reconstructed therefrom are found to be markedly different from the properties exhibited by said composite hologram when waves are reconstructed therefrom. Either of the object waves recorded in said superposed pair of simple holograms can be reconstructed independently of the other, whereas the object waves recorded in a composite hologram can be reconstructed only simultaneously with one another. Furthermore, the group of object waves recorded in a composite hologram necessarily interfere when reconstructed, and images formed from the reconstructed object waves are interferograms. The object wave recorded in one hologram of a superposed pair of simple holograms recorded as described hereinabove need not interfere at all with the object wave recorded from the other hologram of the pair of simple holograms even when both object waves are reconstructed simultaneously, as when the two reference waves used sequentially in the recording process illuminate the developed holograms of the superposed pair simultaneously. When both said object waves are reconstructed simultaneously, interference between them can be avoided by arranging the polarization of one of the two said reference waves so that it is perpendicular to the polarization of the other of the two said reference waves. When it is desired that said object waves interfere with each other when both are simultaneously reconstructed from a superposed pair of simple holograms recorded as described hereinabove, the interference can be produced by arranging the polarization of one of the two said reference waves so that it is parallel to the polarization of the other of the two said reference waves.

Interference between the group of object waves reconstructed from a composite hologram, manifested as fringes in interferograms, makes it impossible to distinguish the individual waves of the group of reconstructed object waves and impossible also to distinguish an image formed from one wave of the group of reconstructed object waves from an image formed by a second wave of the group of reconstructed object waves. If the group of object waves recorded in the composite hologram consists of two object waves, it is impossible to determine, from an interferogram reconstructed from said composite hologram, the algebraic sign of the deformation signaled by the fringe pattern in said interferogram. Yet, were the first object wave to be recorded in one hologram of a superposed pair of simple holograms and the second object wave to be recorded in the second hologram of the superposed pair of simple holograms, the algebraic sign of said deformation could indeed be determined.

The property of coherence between the group of waves reconstructed, as described hereinabove from, a composite hologram recorded as described hereinabove results from the fact that the wavefronts of the reference wave that illuminates the photographic emulsion upon which the composite hologram is to be recorded have the same form and orientation at all instants during the exposure of said photographic emulsion in the recording process. As a result, the positions of the fringes of interference between the first object wave and the reference wave are governed by the same coding as the positions of the fringes of interference between the second object wave and the reference wave and by the same coding that governs the positions of the fringes of interference between any ensuing object wave and the reference wave. In the recording of a superposed pair of simple holograms by the procedure described hereinabove, the positions of fringes of interference between the object wave and the reference wave recorded in the first simple hologram of said superposed pair are governed by a coding that is discrete from the coding that governs the positions of the fringes of interference between the object wave and the reference wave recorded in the second simple hologram of said superposed pair. The possibility that an object wave encoded in the first simple hologram of said superposed pair can be reconstructed discretely from an object wave encoded in the second simple hologram of said superposed pair is a consequence not of the natures of the first object wave and the second object wave, but of the discreteness of the coding by which the first object wave was recorded in the first hologram from the coding by means of which the second object wave was recorded in the second hologram.

The possibility that an image encoded in the first of two holograms of a superposed pair can be reconstructed discretely from an image encoded in the second of two holograms of the superposed pair depends only upon the presence of two reference beams during the recording process and does not depend upon any requirement that the two holograms of said superposed pair be simple holograms; and one or both of the holograms of said superposed pair could be composite holograms. A method of recording a superposed pair of composite holograms is as follows. Referring to FIG. 1, a holographic recording medium such as a holographic plate coated with a photographic emulsion is placed at 20, and a subject under test at 31. Shutters 12 and 11 are held open while shutter 13 remains closed. Shutter 3 is opened briefly and then closed and, after change in subject 31, is opened briefly again and then closed. Shutter 11 is thereafter closed and shutter 13 opened and held open. Shutter 3 is opened briefly and then closed; after change in subject 31, is shutter 3 is opened briefly again and then closed again.

In an alternate means of recording a superposed pair of composite holograms, shutters 12 and 11 are held open while shutter 13 remains closed. Shutter 3 is briefly opened and then closed. Then shutter 11 is closed and shutter 13 opened and held open. Shutter 3 is briefly opened again and closed again. After change in subject 31, shutter 13 is closed and shutter 11 is opened and held open. Shutter 3 is then opened briefly and closed again. After further change in subject 31, shutter 11 is closed again and shutter 13 opened again and held open. Shutter 3 is opened briefly again, and then closed.

Figure 5:
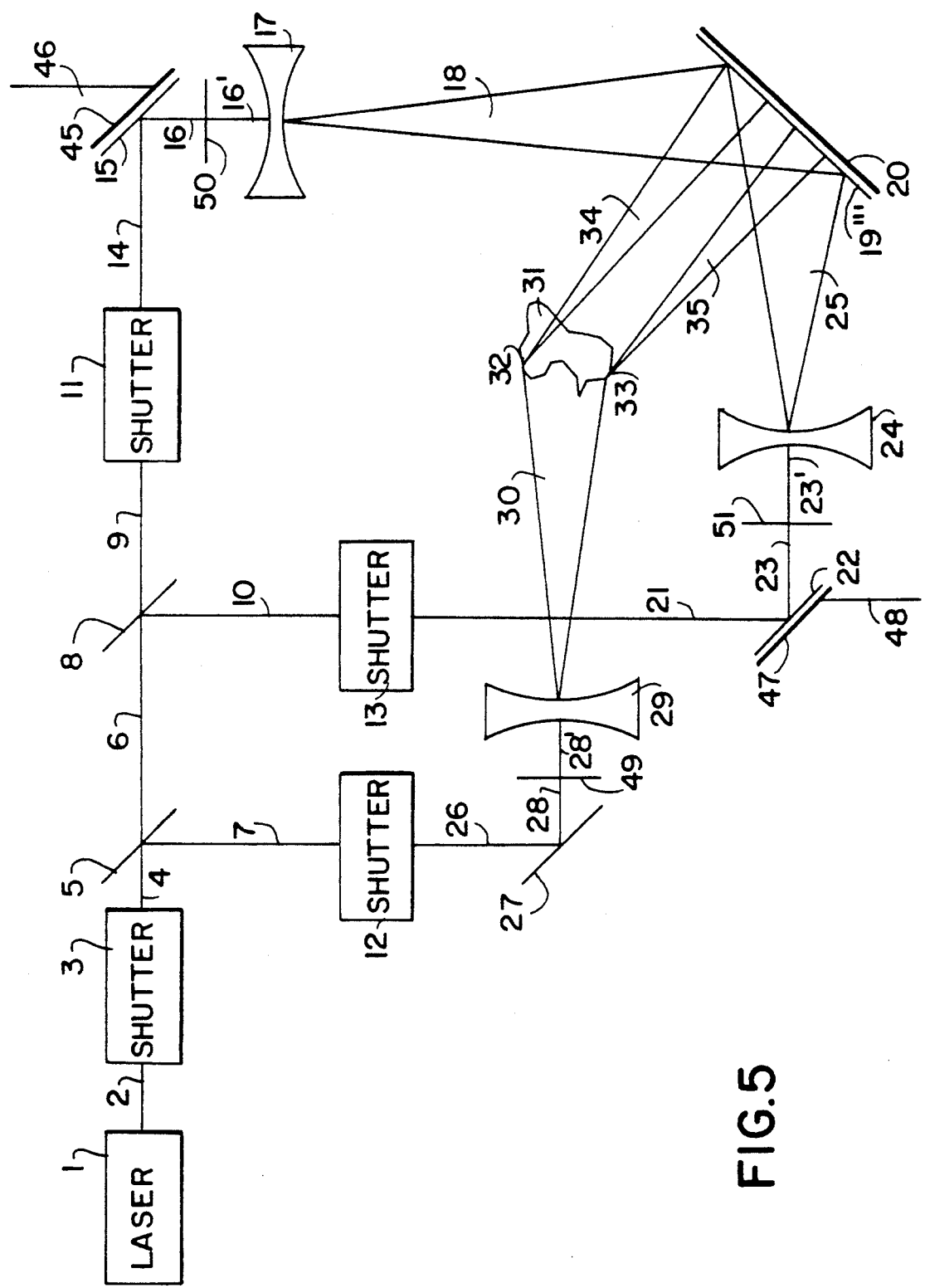
FIG. 5 is a schematic view of an arrangement of apparatus that permits a pair of holograms to be recorded simultaneously in superposition.

It is evident that the recording of a superposed pair of composite holograms does not depend upon any specific alternation of the opening of shutter 11 with the opening of shutter 13. It is also not necessary that the opening of shutter 11 be alternated with the opening of shutter 13: the composite holograms of a superposed pair of composite holograms can be recorded simultaneously. Referring to FIG. 5, a sketch in plan view is shown of an arrangement of apparatus that permits the simultaneous recording of a superposed pair of composite holograms. The parts of FIG. 5 that do not appear also in FIG. 1 are as follows: linear polarizer 50 ensures that sub-beam 16' and divergent beam 18 are linearly polarized, and linear polarizer 51 ensures that sub-beam 23' and divergent beam 25 are linearly polarized. Linear polarizer 49 ensures that sub-beam 28' and diverging beam 25 are linearly polarized. Piezoelectric transducer 45, when supplied with a voltage waveform via line 46, serves to displace mirror 15; a similar function upon mirror 22 is performed by piezoelectric transducer 47 when supplied with a voltage waveform via line 48. During the recording of a superposed pair of composite holograms a holographic recording medium such as a holographic plate coated with a photographic emulsion is placed at 20 and a subject at 31. Shutters 12, 11, and 13 are all held open. Polarizer 50 is oriented in such a way that diverging beam 18 is linearly polarized along a suitable direction. Polarizer 51 is oriented in such a way that diverging beam 25 is linearly polarized along a direction that is perpendicular to the direction of linear polarization of diverging beam 18. Polarizer 49 is oriented in such a way as to ensure that the diverging beam 30 is polarized along a direction that is not perpendicular to the direction of polarization of reference beam 18 and also not perpendicular to the direction of polarization of reference beam 25. The fulfillment of both these conditions, normally possible, can sometimes be facilitated by arranging the path of diverging beam 30 so that its coplanar with the paths of diverging beam 18 and diverging beam 25. If the plane defined by 18 and 25 is horizontal, for instance, the polarization of diverging beam 18 can be made essentially horizontal, and that of diverging beam 25 essentially vertical. The polarization of expanding beam 30 might then be chosen at 45° to the vertical. Initially closed, shutter 3 is opened briefly, then re-closed until such time that some change has taken place in the subject at 31. Immediately upon the re-closing of shutter 3 a steady voltage waveform is supplied to piezoelectric transducer 45 that causes mirror 15 to advance through a distance u wavelengths from the position it occupied during the opening of shutter 3; and a steady voltage waveform is supplied to piezoelectric transducer 47 that causes mirror 22 to advance through a distance v wavelengths, where neither $|u|$ nor $|v|$ is large compared to unity. At such time as change has occurred in subject 31, shutter 3 is again opened briefly and closed once more. In the superposed pair of composite holograms simultaneously recorded as described herein, the wavefronts of the object wave encoded in the first hologram of the superposed pair are identical with the wavefronts of the object wave encoded in the second hologram of the superposed pair but are differently encoded in the first said hologram than in the second said hologram, owing to the difference between the $(4\pi u \cos \theta)/\lambda$ radian shift in the phase of the reference beam 18 used to record the first said hologram and the $(4\pi v \cos \Phi)/\lambda$ radian shift in the phase of the reference beam 25 used to record the second said hologram, where $\Phi$ is the angle of incidence of sub-beam 21 upon mirror 22. In particular, when $(2u \cos \theta) = \lambda(\frac{1}{2}+q)$ and $(2v \cos \Phi) = \lambda(\frac{1}{2}-q)$, with $0 \leq q \leq 0.25$, the first said hologram is a phase-advanced hologram and the second said hologram is a phase-retarded hologram in the sense taught by Sharnoff in the patent cited hereinabove.

Figure 6:
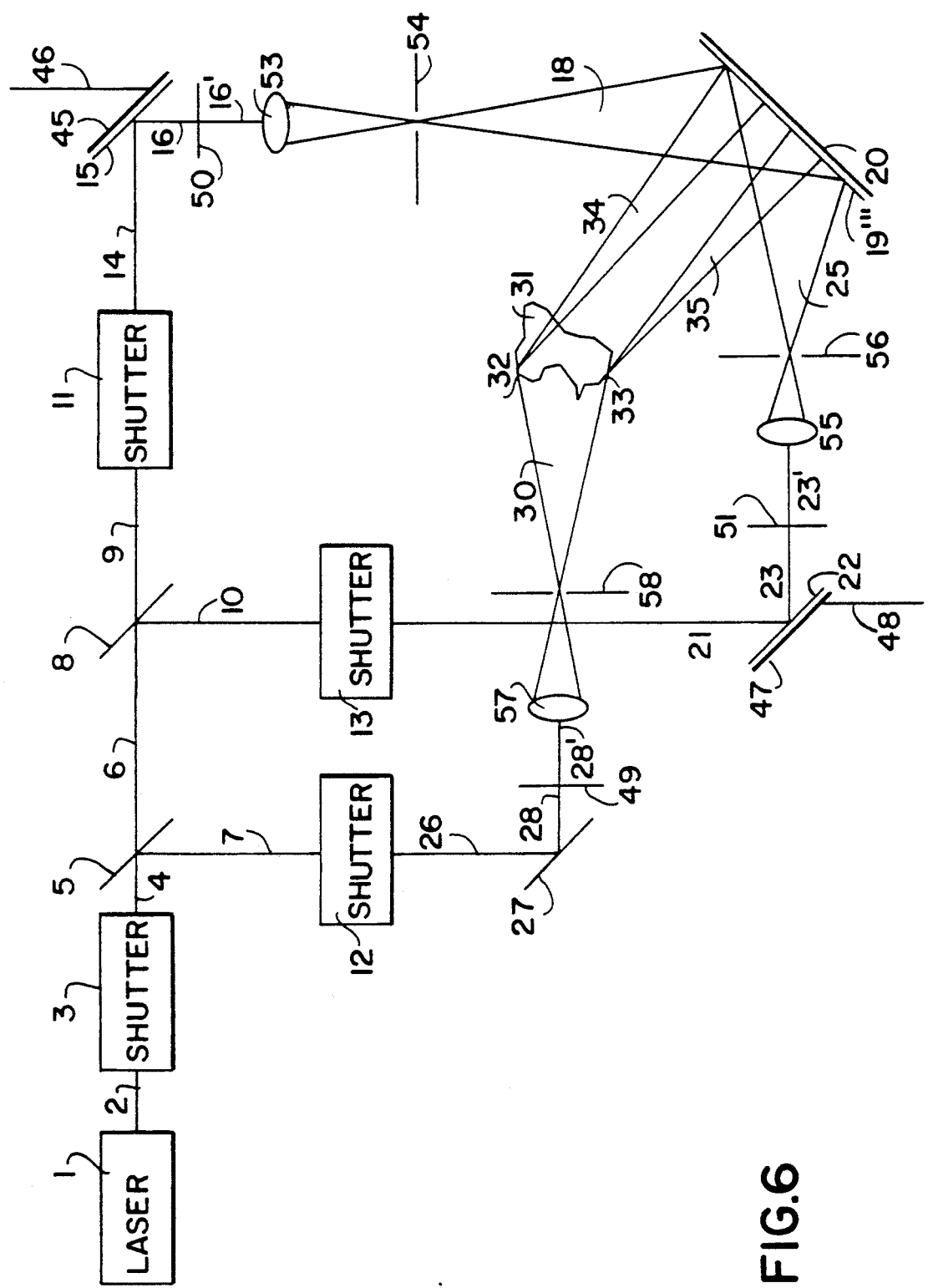
FIG. 6 is a schematic view of a preferred embodiment of the invention in which the reference waves are spatially filtered before impinging upon the holographic plate.

It is sometimes helpful in the recording of holograms that the reference beam or beams be spatially filtered before their incidence upon the holographic emulsion. When this is desired the simple diverging lenses 17 and 24 can be each replaced by a combination of a converging lens and a positionally adjustable pinhole located in the vicinity of the rear focal point of the converging lens, which combination is capable of accomplishing the spatial filtering. Such combinations are available commercially, for instance, from Newport Research Corporation as Model 910. Referring to FIG. 6, the converging lens 53 and pinhole 54 have replaced diverging lens 17 of FIG. 5, and converging lens 55 and pinhole 56 have replaced diverging lens 29 of FIG. 5. Additionally, converging lens 57 and pinhole 58 have replaced the diverging lens 29 of FIG. 5. Apart from the spatial filtering thus provided for both reference beams 18 and 25 and also for object illumination beam 30, the arrangement of FIG. 6 functions in all respects like the arrangement of FIG. 5.

Reconstruction of waves from the composite holograms of a superposed pair of composite holograms recorded simultaneously as described hereinabove may take place as follows. Referring to FIG. 5, the holographic recording medium 19''' now bearing said superposed pair of composite holograms is returned to 20, occupying the same position and orientation as it had during the recording process. Polarizers 50 and 51 are oriented in such a way as to ensure that diverging beam 18 is linearly polarized in a direction parallel to the direction of polarization of diverging beam 25. Shutter 12 is closed and shutter 3 opened and held open. When shutter 11 is open and shutter 13 closed, reference wave 18 illuminates the superposed pair of composite holograms and reconstructs the wave encoded in the composite hologram recorded by means of reference wave 18. When shutter 11 is closed and shutter 13 is open, reference wave 25 illuminates the superposed pair of composite holograms and reconstructs the wave encoded in the composite hologram recorded by means of reference wave 25. When shutter 11 and shutter 13 are both open, the wave encoded in the composite hologram recorded by means of reference wave 18 and the wave encoded in the composite hologram recorded by means of reference wave 25 are simultaneously reconstructed and are capable of interfering with eachother. As explained hereinabove, the image created when the wave encoded in the composite hologram recorded by means of reference wave 18 is reconstructed and brought to focus by converging lens 38 is in fairly good, but not perfect, registration with the image created when the wave encoded in the composite hologram recorded by means of reference wave 25 is reconstructed and brought to focus by converging lens 38.

The images created when the wave encoded in the composite hologram recorded by means of reference wave 18 and the wave encoded in the composite hologram recorded by means of reference wave 25 are simultaneously reconstructed and brought to focus by converging lens 38 are found to be crossed by a set of live interference fringes. The visibility of the live interference fringes can be made high by adjusting the intensity of reference wave 18 relative to the intensity of reference wave 25 so that the average intensity of the image reconstructed by means of reference wave 18 is equal to the average intensity of the image reconstructed by means of reference wave 25. The adjustment of intensities is facilitated by use of a variable beamsplitter at 8, as explained hereinbelow. The spacing and orientation of said live interference fringes are a measure of error in the fairly good registration into which the images have been brought. The error can be sheared to zero by making fine readjustments in the orientation of superposed pair 19''' of composite holograms. In effect, this procedure increases the spacing of the live interference fringes beyond limit, thereby bringing said images into essentially perfect registration, i.e., into collation. In our experience, in which the diameters of the holograms are typically 25 mm, and the wavelength of the light with which the holograms are formed and reconstructed is 514 nm, the angular readjustments required are of the order of tens to hundreds of microradians. Stable angular adjustments of such size can be effected by bringing standard micrometer screws to bear upon appropriate reference surfaces of the holographic plateholder.

In an alternate process of reconstruction of waves from the composite holograms of a superposed pair of composite holograms recorded simultaneously as described hereinabove, the arrangement shown in FIG. 5 is used in fashion similar to that just described, save that polarizers 50 and 51 are left in the orientations in which they were set during the recording process and which ensured that diverging reference beam 18 was linearly polarized along a direction perpendicular to the direction of polarization of diverging reference beam 25. The wave now reconstructed when expanding reference wave 18 illuminates the superposed pair of composite holograms is polarized orthogonally to, and therefore incapable of interfering with, the wave reconstructed when expanding reference wave 25 illuminates the superposed pair of composite holograms. There will therefore be no interference between the images formed from these waves unless they are both passed through a polarizer that forces the images to be formed in common polarization, at 45° to vertical, for instance, when reference beam 25 is polarized vertically and reference beam 18 is polarized horizontally. One means of securing such interference is the placement of a linear polarizer in the image space of converging lens 38. An appropriate position for said polarizer is indicated at 52 in FIG. 4. With interference between reconstructed images thereby established, the spacing of the live interference fringes that result can be increased effectively beyond limit by fine readjustment of the orientation of said superposed pair 19''' of composite holograms. When the spacing of the live interference fringes becomes wider than the images themselves, the two reconstructed images are in essentially perfect registration with one another. As in the case of the collation procedure described in the previous paragraph, nothing in the present procedure requires the holograms or images affected thereby to be composite. The collation procedures will work equally well when applied to the simple images encoded in a pair of simultaneously recorded simple holograms, or to the simple image and the composite image encoded in a pair of simultaneously recorded holograms, only one of which holograms is simple.

The collation procedures described in the two paragraphs immediately preceding differ somewhat in detail, but each requires that the images to be collated be brought into like polarization, and each works best when the images under comparison are adjusted to have like intensity. The former requirement makes the images coherent. The latter adjustment brings the visibility of the live interference fringes that they form to high value, essentially 100%. Once collation has been achieved the images can be scrutinized sequentially, if desired. In particular, the images can be sequentially photographed or recorded by an image scanner. When summed, such sequentially obtained records represent an incoherent sum of the images in question. An alternate procedure for obtaining the incoherent sum of the images in question may sometimes be useful, as in the analysis of photoelastic strain discussed hereinbelow. In the alternate procedure both of the images in question remain simultaneously displayed, but in opposite polarizations. The images thus formed are then necessarily incoherent, and the aggregate intensity at any point within them is the simple sum of their individual intensities at that point. The display of the images in opposite polarization can be effected by ensuring that linear polarizers 50 and 51 are set to orthogonality, as during the holographic recording, and by withdrawing linear polarizer 52, FIG. 4 from the image space.

When two images to be compared are encoded simultaneously in a superposed pair of holograms, it is essential in the practice of our invention that the holograms of said superposed pair be incoherent. In the process of recording simultaneously a superposed pair of holograms as described hereinabove, said holograms are made incoherent as a result of the precaution of ensuring orthogonality between the polarization of the reference wave used to record one of said holograms and the polarization of the reference wave used to record the other of said holograms. Were said precaution not taken in the process of recording a superposed pair of holograms simultaneously, the polarization of one of the reference waves could have a component in common with the polarization of the other reference wave. The reference waves would then be, to some degree, coherent with one another. The development of the holographic recording medium after its exposure during the recording process would then reveal the fringes of the pattern of interference between the reference waves in addition to the fringe patterns that comprise the holograms of said superposed pair. The fringes of the interference pattern of the reference waves comprise a hologram, and this hologram has the property of reconstructing either of the reference waves upon illumination by the other. Such reconstruction takes place in every sublayer of the superposed pair of holograms which, while it may be as thin as an ordinary light-sensitive photographic emulsion, has, nonetheless, a finite thickness. Therefore, in the reconstruction process every sublayer of the superposed pair of holograms, excepting, however, the sublayer closest to the surface at which either of said reference waves impinges upon said superposed pair, is irradiated by both reference waves simultaneously. Thus, if the reference beam used to record the first but not the second of said holograms be made to illuminate the superposed pair of holograms, both the first and the second of the two encoded images will be reconstructed simultaneously and in interference with one another; and if the reference beam used to record the second but not the first of said holograms be made to illuminate the superposed pair of holograms, both the second and the first of the two encoded images will be reconstructed simultaneously and in interference with one another. There will therefore be no absolute way of disentangling the reconstruction of the first encoded image from the reconstruction of the second encoded image.

The images to be compared in the practice of our invention are of two kinds. The first kind of image does not exist independently of a holographic process, for it is only through such a process that it can be created. Examples of such an image are interferograms created in conventional holographic interferometry, and the amplitude-unbalanced images and the phase-advanced and phase-retarded images described by Sharnoff in the patent cited hereinabove. The holograms essential for the creation of such images can be recorded in pairs either sequentially or simultaneously, as explained hereinabove. The second kind of image arises naturally in monochromatic light and so can be readily encoded in a hologram. A speckle pattern obtained by coherent illumination of a subject under test is an example.

Another example of this second kind is afforded by images made in photoelastic analysis, such as that taught by Nisida and Saito in the article "A New Interferometric Method of Two-dimensional Stress Analysis", that was published in the December, 1964 issue of Experimental Mechanics (Vol. 4, pp. 366-376). The work described in that article was carried out with a Mach-Zehnder interferometer upon which was incident unpolarized but monochromatic light; and the subject under test, a transparent plastic sheet whose major surfaces were smooth, plane, and parallel, was placed in one of the interferometer's two paths and illuminated at nearly normal incidence. When the interferometer was properly aligned, the image of the unstressed test subject obtained at the interferometer's output would be free of fringes. The application of plane stress to the test subject then resulted in a network of isopachic and isochromatic fringes in the image formed at the interferometer's output. From the fringes of this network the distribution of plane stress within the test subject could be deduced in its entirety.

Figure 7:
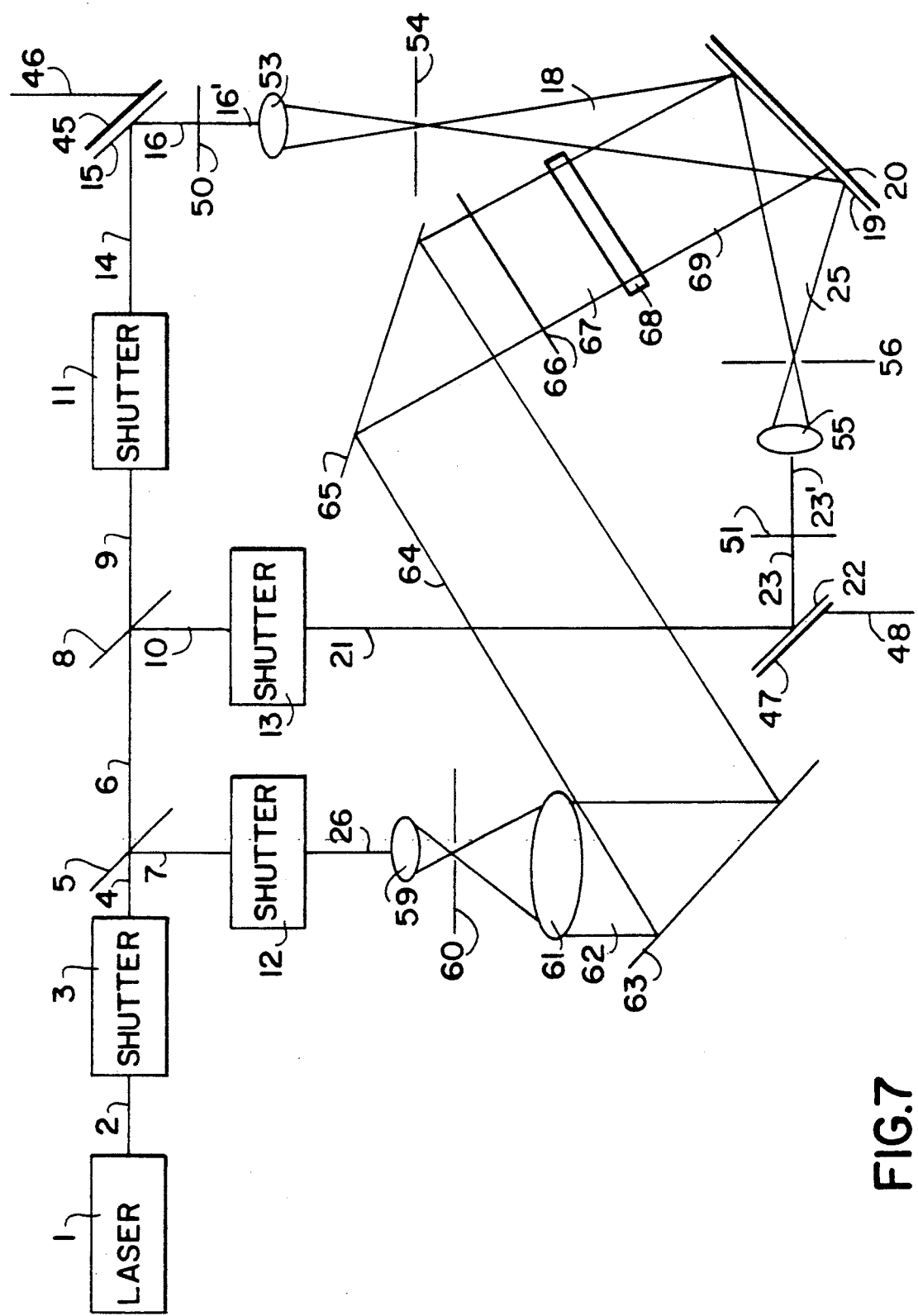
FIG. 7 is a schematic view of a preferred embodiment of the invention as adapted for use in photoelastic analysis.

In the practice of the present invention, photoelastic images of stress distribution equivalent to those made by the method of Nisida and Saito can be readily obtained. Referring to FIG. 7, the test subject at 68 is mounted in a planar stressing device that permits its transillumination by collimated light. The beam 26 emerging from shutter 12 is passed through a beam-expanding combination of converging lenses 58 and 62, the latter of which serves to collimate the emerging expanded beam 62. Expanded beam 62 is reflected from mirror 63 as beam 64, and this is reflected in turn at mirror 65 and passed through quarter-wave plate 66, whose fast axis is set at 45° to the direction of polarization of the light reflected from mirror 65. The resulting circularly polarized collimated beam 67 is made to impinge at near normal incidence upon the test subject 68, and the transmitted light 69, now comprising the object beam, falls upon the holographic emulsion at 19. It will often be useful to employ as spatial filter a pinhole 60 at the focus of converging lens 59. Mirrors 63 and 65 function simply to convey the expanded beam, without changing the curvature of its wavefronts, from collimating lens 62 to quarter wave plate 66. The remaining parts of FIG. 7 correspond exactly to their like numbered parts of FIG. 6. With their help two superposed composite holograms are recorded simultaneously, as explained hereinabove, but with the stipulation that u and v be chosen so that $q=0$. Each of the two superposed holograms is then a difference hologram in the sense distinguished by Sharnoff, and each encodes only the changes in the object wave that result from the alteration of stressing or state of strain between the first and the second of the two flashes used to expose the holograms. In the present invention the double-exposure holograms therefore play the role of the Mach-Zehnder interferometer in the method taught by Nisida and Saito. The effect of balancing the interferometer, in their work, is achieved in the present invention by recording the holograms as difference holograms. Finally, Nisida and Saito's reliance upon unpolarized incident radiation in constructing the network of isopachic and isochromatic fringes finds analogy in the present invention's reliance upon oppositely polarized reference waves in the simultaneous recording of a pair of superposed holograms. The object waves encoded therein can be simultaneously reconstructed, and the images that they form can be placed into accurate registration, as described hereinabove. When this result has been attained the incoherent sum of the two collated images will display a network of isopachic and isochromatic fringes fully equivalent to that which would be found, for the same stress field and test subject, by the method of Nisida and Saito.

In accordance with the procedures set forth hereinabove, images of the second kind can be encoded in pairs of holograms recorded either sequentially in superposition or simultaneously in superposition. Thus, whether two images to be compared are both of the first kind or both of the second kind, or whether they are one of the first kind and one of the second kind, they can be encoded within a superposed pair of holograms and reconstructed individually therefrom, as explained hereinabove.

The methods described hereinabove by which such a superposed pair of holograms is recorded on a holographic plate, or other holographic recording medium, are sufficient to ensure that when the developed holographic plate, or other recording medium, is returned to a position and an orientation very nearly the same as it assumed during the recording process and is illuminated in succession by two waves corresponding, in wavelength and in the curvature and orientation of their wavefronts, to the two reference waves used during the recording of said superposed pair of holograms, the successively reconstructed waves can be put into essentially perfect registration with one another. In particular, if by chance or by design the two images to be compared according to the practice of our invention were identical with one another, the two waves successively so reconstructed from the pair of superposed holograms would be indistinguishable from one another and, if projected upon a scanner by means of one and the same optical system, would be found to create identical images in perfect registration with one another. And if by chance or by design the two images to be compared according to the practice of our invention were identical in some, but not all, of their parts, the two waves successively so reconstructed from the pair of superposed holograms would be distinguishable from one another and, if projected and focussed upon a scanner by means of one and the same aberration-free optical system, would be found to create images identical in all those parts identical in the originals and distinct in all those parts distinct in the originals, the corresponding parts identical in the originals falling, in projection upon the scanner, in perfect registration with respect to one another. The perfect registration of corresponding parts can be tested by observing the quality of the interference pattern created at the scanner, or at any other surface optically conjugate to the scanner, when the said two waves illuminate simultaneously the said developed holographic plate, or other holographic recording medium, placed in the said position and orientation. The said interference pattern will not become observable unless the polarizations of the said reconstructed waves are made to have a component in common and will not become maximally observable unless the polarizations of the said reconstructed waves are made parallel to eachother, as explained hereinabove.

The scrutiny of such an interference pattern is facilitated by such appurtenances as enable the two waves that illuminate the superposed pair of holograms to be adjusted in relative intensity and, independently, in relative phase, in such fashion that corresponding identical parts of the images projected in registration on the aforesaid scanner, or on any other surface optically conjugate to the scanner, have equal amplitudes and opposite phase. Referring to FIG. 5, this can be accomplished if the total of optical path lengths 9, 11, 14, 16, 16', 17, and 18, and the total of optical path lengths 10, 13, 21, 23, 23', 24, and 25 can be varied independently.

Such variation can be accomplished by mounting either mirror 22 or mirror 15 on a piezoelectric transducer, whose driving voltage is provided with an adjustable DC value. Such provision is a natural and obvious modification of the practice taught by Sharnoff in U.S. Pat. No. 4,725,142. The problem of adjusting the relative intensity of 18 and 25 can be solved by using an adjustable beamsplitter at 8. A commercially available beamsplitter excellent for such application is model 930 supplied by Newport Research Corporation, of Fountain Valley, Calif. 92708. By means of this device the ratio of intensities of beams 9 and 10 can be varied over several orders of magnitude without affecting the relative phase or the polarizations of the beams. A beamsplitter that introduces appreciable phase shift could also be used, the phase shift being compensated by adjustment of the DC voltage supplied to PZT 45 or PZT 47.

What is claimed is:

1. A holographic method for the collation and scrutiny of two images of an object in which two linearly and orthogonally polarized reference waves are used to record simultaneously, from waves passed through, reflected from, or scattered by the object and polarized orthogonally to neither of the reference waves, an incoherent pair of holograms superposed upon a common region of a photographic emulsion or other sensor of electromagnetic radiation, one reference wave being used to encode in one of the holograms of said incoherent pair one of the two images to be collated, and the other reference wave being used to encode in the other hologram of said incoherent pair the other of the two images to be collated; and in which the two encoded images of the object are reconstructed simultaneously by illumination of the developed incoherent pair of holograms simultaneously with the two said reference waves and, being thus reconstructed simultaneously, are made coherent by simultaneous passage through a linear polarizer of the reconstructed light by which they are formed, or, failing such simultaneous passage through a linear polarizer of the reconstructed light by which they are formed, are made coherent by adjustment of the polarization of one of the two reference waves that illuminate said developed incoherent pair of holograms so that it becomes parallel to the polarization of the other of the two reference waves that illuminate said developed incoherent pair of holograms; whereupon the spacing of the live fringes of interference between the two encoded images thus reconstructed and brought into coherence, and displaying by said live fringes the degree of their instantaneous misregistration, is increased until it exceeds the diameter of said two encoded images, and the misregistration between said encoded images correspondingly reduced to negligibility, by fine reorientation of said developed incoherent pair of holograms; and whereupon the two encoded images thus collated can be placed into incoherent superposition by removal of the linear polarizer through which the reconstructed light by which they are formed had been simultaneously passed, or, failing simultaneous passage of said reconstructed light through a linear polarizer, by restoration of orthogonality to the polarizations of the two reference waves that illuminate said developed incoherent pair of holograms; whereupon said incoherent superposition can be scrutinized by visual, photographic, or photoelectric means; and whereupon either of the said two encoded images thus reconstructed and collated can be individually scrutinized and processed by visual, photographic, or photoelectric means including digitization, once the reference wave used to encode the other of the said two encoded images is blocked from incidence upon said developed incoherent pair of holograms; whereupon, the said two encoded images having been thus reconstructed, collated, and each individually scrutinized and processed, the difference between the two encoded images can be obtained in digital form.

2. The method according to claim 1, wherein either or both of the images to be collated is a composite image bearing information about two or more states of the object, said composite image being recorded by dual or multiple exposure of the holographic emulsion or other sensor to the object waves and both reference waves simultaneously, or by uninterrupted exposure of said holographic emulsion during an extended period of time.

3. The method according to claim 1, in which the scrutiny of individual images is carried out by an image scanner coupled to a microprocessor or computer.

4. Apparatus for the recording and collation of two holographic images, consisting of a source of coherent electromagnetic radiation;

means in association with said source capable of dividing said coherent electromagnetic radiation into at least three portions, two of which, each separately utilizable as a reference wave, are polarized orthogonally to eachother, and the remaining portions, polarized orthogonally to neither of the aforesaid two portions, being directable at an object under scrutiny in such fashion as to create a pair of holograms of said object superposed simultaneously and incoherently in a common area of a holographic emulsion or other sensor of electromagnetic radiation, one of the images to be collated being encoded in one of the holograms of said pair of holograms and the other of the images to be collated being encoded in the other of said pair of holograms; and capable of reconstructing the image encoded in either hologram of said pair of holograms independently and to the exclusion of the image encoded in the other hologram of said pair of holograms; and capable of reconstructing the image encoded in either hologram of said pair of holograms simultaneously and coherently with the image encoded in the other hologram of said pair of holograms; an capable of displaying the live interference fringes that bear witness to the coherence of and misregistration between the reconstruction of the image encoded in either hologram of said pair of holograms and the simultaneous reconstruction of the image encoded in the other hologram of said pair of holograms; and capable of such fine reorientation of said pair of holograms as permits the spacing of said live interference fringes to be increased until it exceeds the diameter of the two encoded images, and said misregistration correspondingly to be reduced to negligibility; and, with said two encoded images thus collated, capable of reconstructing the image encoded in either hologram of said pair of holograms simultaneously with but incoherently from the image encoded in the other hologram of said pair of holograms.

5. Apparatus for the recording and collation of two holographic images according to claim 4 provided with means for stressing an object under test to determine interferometrically the distortion effects caused by said stressing.

6. Apparatus for the recording and collation of holographic images according to claim 4 in which the scrutiny of individual images is carried out by an electronic scanner and associated microprocessor or computer.

7. The apparatus according to claim 4 wherein either or both of the images is a composite image bearing information about two or more states of the object, said composite image being recorded by dual or multiple exposure of the holographic emulsion or other sensor to the object wave and both reference waves simultaneously, or by uninterrupted exposure of said holographic emulsion during an extended period of time.

* * * * *